United States Patent
Luthardt et al.

(10) Patent No.: US 12,196,560 B2
(45) Date of Patent: Jan. 14, 2025

(54) LOCALIZATION DEVICE FOR VISUALLY DETERMINING THE LOCATION OF A VEHICLE

(71) Applicant: Continental Automotive GmbH, Hannover (DE)

(72) Inventors: Stefan Luthardt, Darmstadt (DE); Volker Willert, Darmstadt (DE); Benedikt Lattke, Nidderau (DE)

(73) Assignee: Continental Automotive GmbH, Hannover (DE)

( * ) Notice: Subject to any disclaimer, the term of this patent is extended or adjusted under 35 U.S.C. 154(b) by 390 days.

(21) Appl. No.: 17/249,227

(22) Filed: Feb. 24, 2021

(65) Prior Publication Data

US 2022/0042804 A1    Feb. 10, 2022

Related U.S. Application Data

(63) Continuation of application No. PCT/DE2019/200102, filed on Aug. 28, 2019.

(30) Foreign Application Priority Data

Aug. 30, 2018 (DE) ...................... 10 2018 214 694.2

(51) Int. Cl.
*G01C 21/30* (2006.01)
*G06T 7/73* (2017.01)
*G06V 20/56* (2022.01)

(52) U.S. Cl.
CPC ............... *G01C 21/30* (2013.01); *G06T 7/73* (2017.01); *G06V 20/56* (2022.01); *G06T 2207/30252* (2013.01)

(58) Field of Classification Search
CPC .......... G01C 21/30; G01C 21/28; G06T 7/73; G06T 2207/30252; G06V 20/56
See application file for complete search history.

(56) References Cited

U.S. PATENT DOCUMENTS 11,003,919 B1 *   5/2021   Ghadiok ................ H04N 7/181
11,313,684 B2 *   4/2022   Chiu .................. G01C 21/3476
(Continued)

FOREIGN PATENT DOCUMENTS

CN     102359783 A    2/2012
CN     105277190 A    1/2016
(Continued)

OTHER PUBLICATIONS

Simultaneous Localization and Map Change Update for the High Definition Map Based Autonomous Driving Car (Year: 2018).*

(Continued)

*Primary Examiner* — Kyle T Johnson

(57) ABSTRACT

A localization device for visually determining the location of a vehicle includes a camera unit for capturing image data and a control unit. The control unit is configured to recognize at least one landmark in the captured image data and to determine a quality value for each landmark. The determination of the quality value involves multiple recognitions of the particular landmark. In addition, multiple quality values for one landmark can be determined for different observation positions or observation directions. The control unit is further configured to adjust the quality value of a landmark already contained in a map, based on a new recognition by the localization device. The control unit is configured to determine the position of the localization device based on the recognized landmarks in conjunction with the map. The control unit is further configured to determine the position of landmarks in relation to a global coordinate system.

18 Claims, 2 Drawing Sheets

(56) References Cited

U.S. PATENT DOCUMENTS

| | | | | |
|---|---|---|---|---|
| 2008/0273757 | A1* | 11/2008 | Nakamura | G06V 20/56 382/104 |
| 2011/0161032 | A1* | 6/2011 | Stahlin | G01C 21/30 702/94 |
| 2012/0121161 | A1* | 5/2012 | Eade | G05D 1/0253 901/1 |
| 2012/0213443 | A1* | 8/2012 | Shin | G06T 7/77 901/1 |
| 2015/0213617 | A1* | 7/2015 | Kim | G06T 7/73 382/103 |
| 2015/0378015 | A1* | 12/2015 | You | G01S 13/06 701/469 |
| 2016/0161265 | A1 | 6/2016 | Bagheri | |
| 2017/0010618 | A1* | 1/2017 | Shashua | B60W 60/00 |
| 2017/0122763 | A1* | 5/2017 | Meier | G08G 1/09675 |
| 2018/0067199 | A1 | 3/2018 | Röwekämper et al. | |
| 2018/0161986 | A1* | 6/2018 | Kee | G06V 20/10 |
| 2018/0231385 | A1* | 8/2018 | Fourie | G01C 21/188 |
| 2019/0271550 | A1* | 9/2019 | Breed | F21S 41/13 |
| 2020/0225043 | A1* | 7/2020 | Buczko | G01C 21/30 |
| 2020/0300637 | A1* | 9/2020 | Chiu | G05D 1/0253 |
| 2021/0190523 | A1* | 6/2021 | Stumpf | G06V 20/56 |
| 2021/0231460 | A1* | 7/2021 | Uno | G06T 7/254 |
| 2022/0299322 | A1* | 9/2022 | Ikeda | G01C 21/30 |

FOREIGN PATENT DOCUMENTS

| | | |
|---|---|---|
| CN | 105793669 A | 7/2016 |
| DE | 102015011358 A1 | 3/2016 |
| WO | 2017172778 A1 | 10/2017 |
| WO | 2018140701 A1 | 8/2018 |

OTHER PUBLICATIONS

Visual SLAM for Autonomous Ground Vehicles (Year: 2011).*
Han-Pang Chiu, et al., "Robust Vision-Aided Navigation Using Sliding-Window Factor Graphs" 2013 IEEE International Conference on Robotics and Automation (ICRA) Karlsruhe, pp. 46-53, Germany, May 6-10, 2013.
Stefan Luthardt, et al., "LLama-SLAM: Learning High-Quality Visual Landmarks for Long-Term Mapping and Localization", 2018 21st International Conference on Intelligent Transportation Systems (ITSC), Nov. 4-7, 2018, Maui, Hawaii, USA.
M. Burki, et al., "Appearance-Based Landmark Selection for Efficient Long-Term Visual Localization" pp. 4137-4143, 2016 IEEE/RSJ International Conference on Intelligent Robots and Systems (IROS) Daejeon Convention Center Oct. 9-14, 2016, Daejeon, Korea.
Juan Andrade-Cetto, "Temporal Landmark Validation in CML" IEEE, pp. 1576-1582, International Conference on Robotics and Automation, Taipei, Sep. 2003.
Guillaume Bresson, "Simultaneous Localization And Mapping: A Survey of Current Trends in Autonomous Driving" IEEE Transactions on Intelligent Vehicles, vol. 2, No. 3, pp. 194-220, Sep. 2017.
DPMA Search Report dated Apr. 17, 2019 for the corresponding Germany Patent Application 10 2018 214 694.2.
International Search Report and the Written Opinion of the International Searching Authority mailed on Jan. 2, 2020 for the counterpart PCT Application No. PCT/DE2019/200102.
Notice of First Office Action dated Jan. 31, 2024 for the counterpart Chinese Patent Application No. 201980055658.3 and translation of same.
Li Guangwei et al, "Research on landmark recognition algorithm in INS/Vision integrated navigation system", Automation of the ordnance industry, vol. 27, No. 6, Jun. 15, 2008, Article No. 1006-1576(2008) 06-0005-04, VIP Information http://www.cqvip.com and translation of same. Cited in NPL Cite No. 1.
Notice of Second Office Action dated Oct. 28, 2024 for the counterpart Chinese Patent Application No. 201980055658.3 and translation of same.

* cited by examiner

LOCALIZATION DEVICE FOR VISUALLY DETERMINING THE LOCATION OF A VEHICLE

CROSS-REFERENCE TO RELATED APPLICATIONS

This application is a continuation of International application No. PCT/DE2019/200102, filed Aug. 28, 2019, which claims priority to German patent application No. DE 10 2018 214 694.2, filed Aug. 30, 2018, each of which is hereby incorporated by reference.

TECHNICAL FIELD

The technical field relates generally to localization devices for visually determining the location of a vehicle and producing a map for visual localization.

BACKGROUND

The development of driver assistance systems up to automated driving has been increasingly attracting attention for a number of years. A key component of these systems is an accurate perception of the environment. This comprises, inter alia, further road users, the infrastructure and courses of roads. In addition to signal processing by sensors directly in the vehicle, precise, digital maps are also indispensable for the navigation of autonomous systems. The process of creating these maps by conventional surveying methods is both complex and costly. Localization or accurate positioning in the maps further constitutes a major challenge, since the vehicle can only be controlled in an automated manner with an accurate localization within the maps, so that, e.g., the correct lane is selected.

As such, it is desirable to present a system for determining an accurate location of a vehicle. In addition, other desirable features and characteristics will become apparent from the subsequent summary and detailed description, and the appended claims, taken in conjunction with the accompanying drawings and this background.

BRIEF SUMMARY

One exemplary embodiment relates to a localization device for visually determining the location of a vehicle. The localization device includes a camera unit for capturing image data and a control unit. The control unit is configured to recognize one landmark or multiple landmarks in the captured image data. The control unit is further configured to determine a quality value for each recognized landmark, which quality value corresponds to the recognizability, the permanence, and/or the contribution of the landmark to the localization task. The determination of the quality value involves multiple recognitions of the landmark. This can take place due to multiple different journeys. In addition, multiple quality values for one landmark can be determined for different observation positions or observation directions. The control unit is further configured to adjust the quality values of a landmark already contained in a map, in particular in a digital map, based on a new recognition by the localization device, and the control unit is configured to determine the position of the localization device based on the recognized landmark in conjunction with the map.

The accuracy of the localization can be improved by a visual localization. In other words, a position can be accurately determined. By recognizing landmarks, in particular multiple landmarks, it is possible to infer the ego position. Said landmarks can be recognized by a control unit in image data of a camera unit. The control unit can further determine a quality value for the recognized landmark, which quality value corresponds to the recognizability, the permanence, and/or the contribution of said landmark to the localization task—in other words, how easily the landmark can be recognized or identified again, how probable a lasting presence of said landmark is and how great its contribution to the localization of the vehicle is. The contribution to the localization can be captured, e.g., by way of the deviation between the measured position of the landmark in the image data and the expected positions in the image data.

A landmark may have been recognized during multiple journeys, which can also indicate a high permanence of said landmark. Consequently, other vehicles can be omitted as landmarks. It should be noted that the quality value can increase as the number of recognitions increases. The control unit can further have recourse to a map containing landmarks. Consequently, the ego position can be determined by means of the recognized landmarks and landmarks present in the map, e.g. by way of triangulation. The control unit can further adjust the quality value and/or the position of the landmark contained in the map on the basis of the current recognition. In other words, the map can be produced with contained landmarks for visual localization and the ego position can simultaneously be determined based on the recognized landmarks. Consequently, the map can constantly be kept updated. The control unit can further determine multiple quality values for a landmark depending on the observation position or observation direction, or these can be stored in the map. Additionally, different quality values can also be determined or stored depending on the time of day and/or year.

A prominent or conspicuous object, a prominent part of an object or another prominent part of the surroundings can be understood to be a landmark. Said object or said part is distinguished by the fact that it can be identified again, so that a localization is possible. The landmark can, for example, be a part of a street lamp, a traffic sign, traffic lights, a building, a curbstone, an electricity box, a hydrant, a signpost, a parking meter, a wall, a billboard or a sculpture.

The quality value can be determined by the control unit. This can in particular depend on the recognizability and the permanence of the landmark. For example, a street lamp can be judged to be very permanent since it can be assumed that this will also be present for some time. Objects which are mounted at an elevation, such as, e.g., a traffic sign, can further have good recognizability. The contribution of the landmark to the localization of the vehicle can additionally be integrated. To this end, e.g., the deviation between the measured position of the landmark in the image data and the expected positions in the image data can be determined. A small deviation can then lead to a higher quality. The quality value can, furthermore, also be assessed and determined, for example, depending on the position of the landmark and any neighboring image regions. The quality value can, for example, assume a value between 0 and 1, wherein 1 denotes maximum recognizability and permanence. It should be noted that the parameters of the quality value can be weighted similarly or differently. It should be noted that the quality value can be continually adjusted by current recognitions.

The term "digital maps" or "digital map data" is also to be understood to be maps for advanced driver assistance systems (ADAS), automated or autonomous driving, without navigation happening.

According to an embodiment, the control unit is further configured to add the recognized landmark to a map if the quality value thereof exceeds a first threshold. This first threshold can be fixed or adaptively established, depending on the particular situation, e.g., from statistics of the quality values of multiple landmarks in a limited region.

Consequently, it can be ensured that only landmarks for visual localization which have a certain quality value are contained in the map. Said landmarks can be suitable for visual localization, since the latter can be recognized and are permanent. It can further be required that the landmark has been recognized at least in two different journeys and provided with a quality value, so that erroneous recognitions can be filtered out. It should be noted that, in addition to the quality value and the landmark, the position of the landmark in the map can also be adjusted. In particular, the position of the landmark can be determined relative to the other landmarks of the map.

According to an embodiment, the control unit is configured to determine multiple quality values for a landmark depending on a particular observation position or observation direction and to add the quality values to the map.

In other words, the recognizability and the permanence of a landmark can be modified with the observation position or the observation direction. For example, a traffic sign can be easily recognizable from a frontal view, but no longer recognizable from a more acute angle. It is also possible that a traffic sign is no longer easily recognizable as of a certain distance or that it is concealed by other objects on a permanent basis.

Consequently, the control unit can determine the quality value depending on the observation position or the observation angle of the camera unit and save it in the map.

According to a further embodiment, the control unit is configured to remove a landmark from the map if the quality value thereof falls short of a second threshold during a new recognition. This second threshold can be fixed or adaptively established, e.g., from statistics of the quality values of multiple landmarks in a limited region.

As well as being added, a landmark can also be removed from the map again if the quality value thereof falls short of a second threshold. The first threshold and the second threshold can be different or the same. It may be necessary to remove the landmark if said landmark is no longer present or if it has altered, for example a traffic sign may have been dismantled. Consequently, this landmark no longer exists and can no longer be utilized for localization either. Consequently, the map having the landmarks can be constantly kept small and compact, without containing unnecessary landmarks.

According to an embodiment, the control unit is configured to determine the quality value of the landmark depending on the particular time of day or year. Consequently, seasonal alterations to the landmark, for example to trees or concealments by trees, can also be considered. It is also possible that it is easier or more difficult to recognize a landmark at night or in the dark than during the day or in the light. By way of example, a neon sign can serve as a landmark at night.

According to an embodiment, the control unit is configured to determine the position of the localization device with the aid of an optimization method. Said method can e.g., be a pose graph optimization. As a result, different position data can be fused with one another so that a final position can be accurately determined or an accurate localization can be possible. It should be noted that this accurately determined position can be both the ego position and the position of the recognized landmarks. In this case, odometry data (wheel speed, steering angle and/or gyroscope), GPS data and data of the visual localization can in particular be fused with one another in order to obtain an accurate position.

According to an embodiment, the camera unit has a stereo camera.

According to an embodiment, the localization device further has a positioning device which is configured to determine the position of recognized landmarks.

The positioning unit can serve to describe the recognized landmarks in a global coordinate system and to add said landmarks to a digital road map. The positioning unit can initially determine the global position of the localization device, for example by means of satellite navigation (GPS or Galileo) or by means of mobile radio tracking. By linking said global position determination to the method for determining the landmark position described above and below, the landmark position can also be determined in a global coordinate system. The error during the localization in the map can further be averaged out by way of the large number of the individual determined positions of the landmarks (during each journey). An optimization method such as the pose graph optimization can in particular be used for this purpose. Moreover, the positioning of the localization device can be supported by odometry (trip counters in the car) and further improved. Consequently, an accurate mapping of the landmarks and consequently, in turn, an accurate visual localization can be achieved.

It should furthermore be pointed out that, in the context of the present disclosure, GPS stands for all global navigation satellite systems (GNSS) such as, e.g., GPS, Galileo, GLO-NASS (Russia), Compass (China), or IRNSS (India).

It should be pointed out at this juncture that the position determination of the vehicle can also be effected by way of a cell positioning. This is in particular possible when using GSM or UMTS networks.

According to an embodiment, the quality value increases as the number of recognitions increases. In this case, the permanence, the recognizability and/or the contribution of the landmark to the localization can in particular increase. In the event that an existing landmark is not recognized at one position, the quality value of said landmark can also be reduced.

According to an embodiment, the control unit is configured to calculate a quality value for the recognized landmark for an observation position or observation direction, wherein no image data form the basis of said observation position or observation direction. In other words, the control unit can calculate or estimate the quality value to be expected there for any observation position or observation direction. The control unit can interpolate or extrapolate in this case. To this end, the relationship between the quality values can be described e.g., with a probabilistic graphical model.

According to a further embodiment, the localization device further has a sending/receiving unit which is configured to transfer the recognized landmark and the quality values thereof or the map to a backend or to another localization device.

In order to transfer the landmarks and the quality values thereof or the map or to receive the map from a backend or another vehicle, the localization device can have a sending/receiving unit. The backend can subsequently carry out the further processing of the landmark and of the quality values. The transfer can be advantageously effected wirelessly or by radio.

The wireless transfer or the wireless receipt of the grid maps can be effected by Bluetooth, WLAN (e.g., WLAN 802.11a/b/g/n or WLAN 802.11p), ZigBee or WiMax or cellular radio systems such as GPRS, UMTS, 3G, 4G or LTE. The use of other transfer protocols is also possible. The indicated protocols offer the advantage of the standardization already effected.

A further aspect relates to a backend for producing a map for visual localization. The backend has a sending/receiving unit which is configured to receive a landmark and the quality values thereof or a map from a localization device described above and below. The backend is configured to produce or to determine at least one combined quality value for said landmark from quality values for the same landmark. The backend can further produce or determine multiple combined quality values for a landmark, in particular as a function of the observation position and the observation direction.

In other words, the backend can receive the recognized landmarks and the quality values thereof from a multiplicity of localization devices and, based thereon, produce a map having the landmarks and the combined quality values thereof, wherein the combined quality values are calculated from multiple quality values of different vehicles and journeys.

A backend is understood to be a central or decentralized processing unit which can exchange data with the individual localization devices. Said data exchange can in particular take place via the internet or a comparable network. The backend can, for example, be executed as a server which processes and stores the map having the landmarks and the associated quality values from a multiplicity of vehicles. Consequently, it is not necessary for every vehicle to perform the evaluation, and the map having the landmarks can also be created more quickly and more reliably by a multiplicity of vehicles. Alterations in relation to the landmarks can further be quickly incorporated into the map so that the latter constantly represents the current status.

A further aspect relates to a vehicle having a localization device described above and below.

The vehicle is, for example, a motor vehicle such as a car, bus or truck, or also a rail vehicle or a ship.

A further aspect relates to a method for visual localization. The method has the following steps:
  capturing of image data by a camera unit;
  recognizing of one landmark or multiple landmarks in the captured image data by the control unit;
  determining, by the control unit, of a quality value for each recognized landmark, which quality value corresponds to the recognizability, the permanence and/or the contribution of the particular landmark to the localization, wherein the quality value involves multiple recognitions of the landmark and can be dependent on the observation position or observation direction of the particular landmark;
  adding, by the control unit, of the recognized landmarks to a map if the quality value thereof exceeds a first threshold; and
  determining a position based on the recognized landmarks in conjunction with the map.

It should be noted that the steps of the method can also be executed in a different order or simultaneously. There can also be a longer period of time between individual steps.

A further aspect relates to a program element which, if it is run on a control unit of a localization device, instructs the localization device to perform the method described above and below.

A further aspect relates to a computer-readable medium, on which a program element is stored, which, if it is run on a control unit of a localization device, instructs the localization device to perform the method described above and below.

BRIEF DESCRIPTION OF THE DRAWINGS

Further features, advantages and possible applications of the invention are set out by the following description of the exemplary embodiments and the figures.

The figures are schematic and not to scale. If the same reference numerals are indicated in the following description of the figures, these denote the same or similar elements.

DETAILED DESCRIPTION

Figure 1:
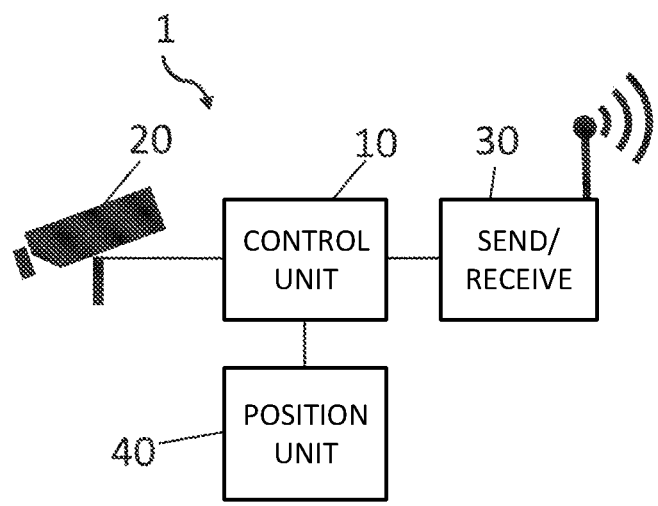
FIG. 1 shows a block diagram of a localization device according to an embodiment.

FIG. 1 shows a localization device 1 which has a control unit 10 and a camera unit 20. The localization device 1 can optionally further have a sending/receiving unit 30 and a positioning unit 40. The camera unit 20 captures image data of the vehicle surroundings. Said image data can be evaluated by the control unit 10 in order to recognize landmarks, i.e. prominent objects, prominent object parts or parts of the surroundings such as, for example, parts of street lamps, traffic signs, traffic lights, buildings, curbstones, electricity boxes, hydrants, signposts, parking meters, walls, billboards or sculptures in said image data. The control unit 10 can further determine a quality value for each recognized landmark, which quality value corresponds to the recognizability or visibility, the permanence and/or the contribution of the particular landmark to the localization. The more easily recognizable it is, the more permanent and the higher the contribution of the particular landmark to the localization is, the higher the quality value is. Consequently, it can be ensured that only landmarks which are suitable for localization and which can be easily seen are incorporated into a map. It is true that another vehicle can be easily recognized, but this other vehicle is not permanent, since it can be driven away. Consequently, it is not suitable as a landmark or for the localization. By contrast, a lamp or a traffic sign can be easily recognized, being typically mounted at an elevation, and is permanent. Consequently, a lamp is predestined to be awarded a high quality value and to serve as a landmark for the localization device in order to visually determine the location of a vehicle. Based on the quality value of a landmark, the control unit 10 can add said landmark to a digital road map or can adjust or modify the quality value of the landmark present in the map accordingly. A landmark can in particular then be added to the map if the quality value of the landmark exceeds a first threshold. This first threshold can be predefined or fixed or even established adaptively.

Alternatively or additionally, the control unit can also remove a landmark from the map if the quality value of the landmark falls short of a second threshold which can likewise be predefined or adaptive. Consequently, the map having the landmarks for visual localization can be constantly kept updated so that a visual localization is possible. For the visual localization or positioning, the control unit 10 can compare the recognized landmarks with the landmarks in the map and determine or calculate the distance from, and the angles to, the particular recognized landmarks therefrom. Consequently, the ego position and also the position of new or already known landmarks can be accurately determined. As a result, a localization within the map is possible. This can, for example, take place with the assistance of an optimization method, e.g., a pose graph optimization. It should be noted that the positions of the landmarks in the map can be located. Alternatively or additionally, the control unit 10 can determine the quality value depending on an observation position or observation direction. In this case, the angle and distance between the landmark and the localization device 1 can in particular be considered. Alternatively or additionally, the quality value for the landmark can also depend on the time of day or year, and multiple quality values can accordingly be determined depending on this, for example neon signs can serve as a landmark at night. The control unit 10 can further calculate or determine a quality value for an observation position or observation direction of the landmark which is not saved by captured image data. By using landmarks having a certain quality value, it can be ensured that only easily visible and permanent landmarks are incorporated into the map and, consequently, a few landmarks in the map are sufficient for the visual localization, as a result of which storage space can be saved. Thus, an unnecessary addition and removal of landmarks to/from the map can further be avoided. Moreover, in the case of a landmark having a high quality value, the probability that this can also be actually utilized during the visual localization and improves the position estimation is higher, as a result of which the quality and the accuracy of the visual localization can in turn be improved.

The positioning unit 40 can determine the position of the localization device 1 (that is to say the ego position) or the position of a recognized landmark in relation to a global coordinate system. Errors can be averaged out thanks to the plurality of the recognitions and the position determinations, and the visual localization can supply more precise results. The positioning unit 40 can, for example, have a GPS module or a comparable satellite navigation module. Alternatively or additionally, the positioning unit 40 can also determine the positions via mobile radio.

The localization device 1 can further transfer or send the recognized landmarks and the quality values thereof to a backend or to another localization device by means of a sending/receiving unit 30. Said backend can subsequently combine multiple quality values for the same landmark from different localization devices of different vehicles into combined quality values and add these to a digital map, alter the quality values or remove the landmark from the map. To this end, the sending/receiving unit 30 can in particular have a wireless data transfer, for example WLAN, or mobile radio. The backend can further be connected to the localization device 1 via the internet or a comparable network. Consequently, a current, fast and inexpensive possibility for the visual localization can be created. The particular errors of the individual localization devices 1 can further be averaged out by multiple landmarks and quality values from different localization devices 1.

Figure 2:
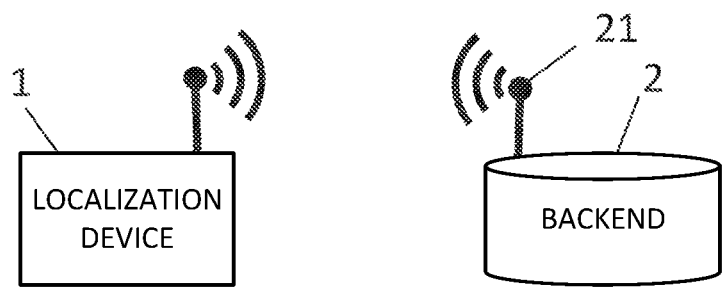
FIG. 2 shows a block diagram of a localization device and a backend for visual localization according to an embodiment.

FIG. 2 shows a block diagram of a localization device 1 and a backend 2. The localization device 1 and the backend 2 are connected to one another via an at least partially wireless data connection, e.g., mobile radio or WLAN. The localization device 1 can, in this case, send, transfer or transmit the recognized landmarks and the determined quality values thereof to the backend 2. The backend 2 can receive landmarks and the quality values thereof from multiple different localization devices 1 in different vehicles.

The backend 2 can subsequently combine this multiplicity of quality values for one landmark into one quality value, possibly depending on the particular observation position or observation direction, and add the landmark to the digital map or remove it from the latter or even adjust already existing quality values. In other words, the backend 2 can produce a map having a plurality of landmarks, which can be utilized for visual localization, from a multiplicity of localization devices 1. It should be noted that the backend 2 can also send the map having the landmarks to the localization device 1 or to the vehicle having the localization device 1 so that the vehicle can constantly have the current map with the landmarks.

Figure 3:
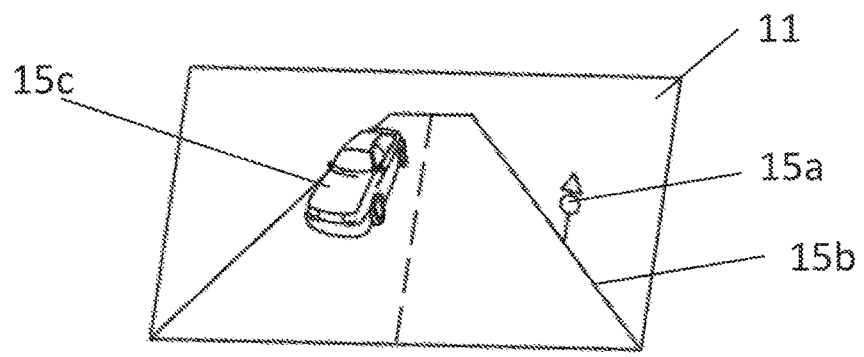
FIG. 3 shows image data captured by a camera unit according to an embodiment.

FIG. 3 shows captured image data 11. Multiple objects 15a, 15b, 15c are contained in said image data 11. In the image data 11 from FIG. 3, a road having an oncoming vehicle 15c as well as a traffic sign 15a are illustrated. The oncoming vehicle 15c is not suitable as a landmark for visual localization since the vehicle is moving or can be moved. Consequently, it cannot be ensured that said vehicle 15c will be at this location again the next time. Consequently, a low quality value is determined for the vehicle 15c. A curb, curbstone or a lane boundary 15b can be suitable as a landmark since this is normally permanent, however the curbstone or the lane boundary 15b can, in some circumstances, have poor visibility or recognizability, for example because leaves or parked vehicles are concealing the curbstone. Consequently, a medium quality value is determined for the curbstone or for the lane boundary. The traffic sign 15a is very suitable as a landmark, since it is permanent and easily visible or recognizable. Consequently, a high-quality value is determined for the traffic sign. In other words, a visual determination of the location of the vehicle can be performed with the traffic sign 15a as a landmark. For reasons of clarity, only a few landmarks have been depicted in the image data, however it should be mentioned that a plurality of landmarks should advantageously be present for the localization.

Figure 4:
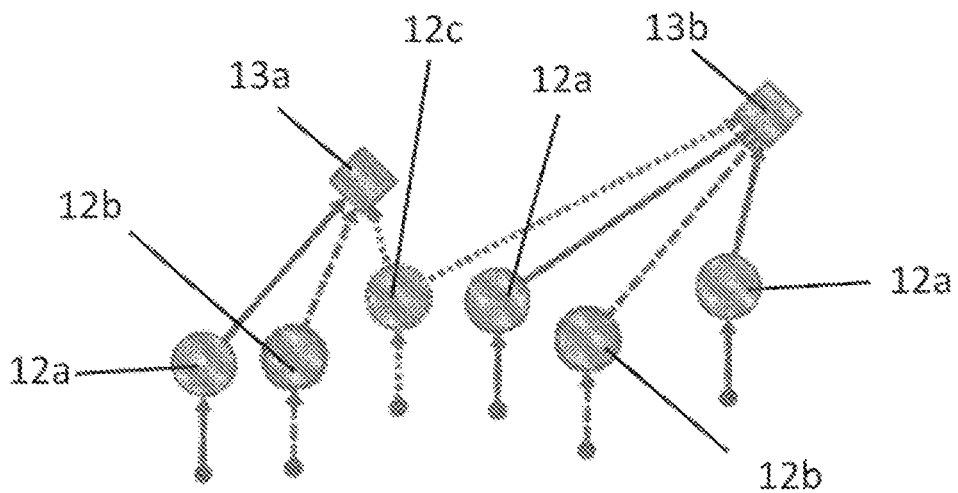
FIG. 4 shows landmarks recognized by multiple passages according to an embodiment.

FIG. 4 shows multiple recognized landmarks 13a, 13b. Said landmarks 13a, 13b have been recognized in multiple passages 12a, 12b, 12c from different positions. The individual positions of the localization device in relation to the position of the recognized landmarks 13a, 13b are depicted by the circles. In a first passage 12a, the first landmark 13a has been captured from a first position, recognized and provided with a quality value (solid line with arrow). At later points in time, the second landmark 13b has been captured from two other different positions, recognized and provided with a quality value, in the first passage 12a.

In the second passage 12b, for example a second journey or a journey of another vehicle, the first landmark 13a and the second landmark 13b have each been captured at a new position, recognized and provided with a quality value (line with large dashes and arrow). During the third passage 12c, the first landmark 13a and the second landmark 13b have been jointly captured from a further position by the localization device, recognized and provided with a quality value (line with short dashes). The control unit can subsequently combine the quality values of each recognition of the landmark depending on the particular observation position or observation direction. If the quality value which is produced as a result is higher than a first threshold, the landmark can be added to a map. A landmark already present in the map or the quality values thereof can further be adjusted or altered.

Figure 5:
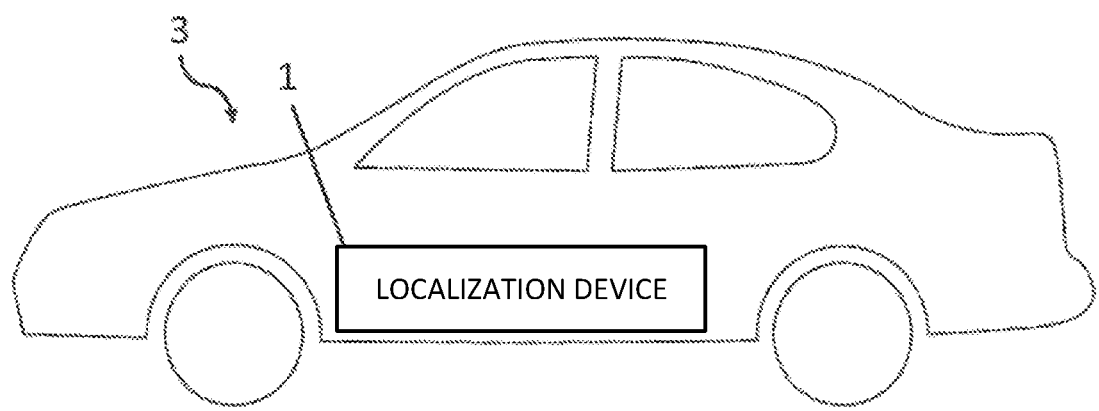
FIG. 5 shows a vehicle having a localization device according to an embodiment.

FIG. 5 shows a vehicle 3 having a localization device 1 for visual localization. Said localization device 1 can also have recourse to sensors already present in the vehicle 3 such as e.g., a camera, a GPS module, a gyrometer, a lidar, a radar or an ultrasonic sensor.

Figure 6:
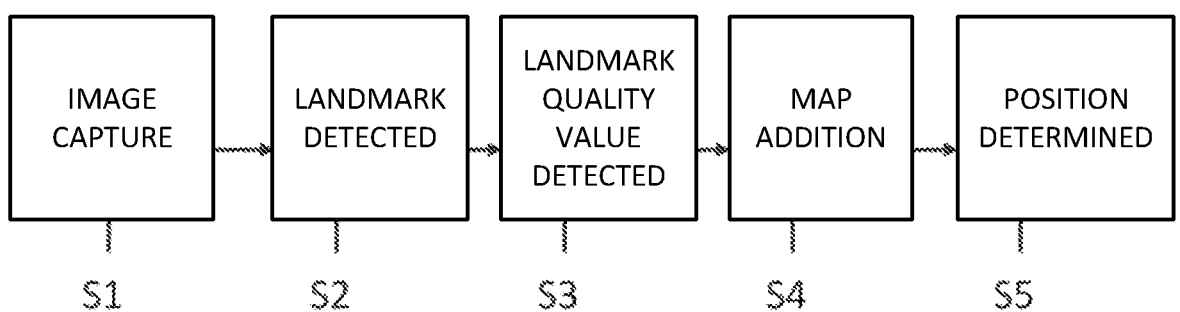
FIG. 6 shows a flow chart for a method for visual localization of a vehicle according to an embodiment.

FIG. 6 shows a flow chart for a method for visual localization of a vehicle. In step S1, image data are captured by a camera unit. In step S2, landmarks in the captured image data are recognized, detected or determined by a control unit. In step S3, a quality value for each recognized landmark is determined by the control unit, which quality value corresponds to the recognizability, the permanence and/or the contribution of the particular landmark to the localization. Said quality value is in particular determined on the basis of multiple different recognitions of the landmark and can be dependent on the observation position or observation direction of the particular landmark. In step S4, the recognized landmark and the quality value thereof is added to a map if the quality value is higher than or exceeds a first threshold. Finally, in step S5, the position of the vehicle or of a localization device is determined by means of the recognized landmarks and the map.

The invention claimed is:

1. A localization device for visually determining a location of a vehicle, comprising:
    a camera unit for capturing image data; and
    a control unit comprising a control circuit on which program instructions are executed,
    wherein the control unit is configured to recognize at least one landmark in the captured image data,
    wherein the control unit control circuit is configured to determine a quality value for each recognized landmark, which quality value corresponds to at least one of recognizability, permanence, or contribution of the landmark to localization, wherein the determination of the quality value involves multiple recognitions of the landmark,
    wherein the control unit control circuit is configured to adjust the quality value of a second landmark already contained in a map, based on a new recognition by the localization device, and
    wherein the control unit control circuit is configured to determine a position of the localization device based on the at least one recognized landmark in conjunction with the map and configured to calculate the quality value for the at least one recognized landmark for an observation position or observation direction, wherein no image data form a basis of the observation position or the observation direction.

2. The localization device according to claim 1, wherein the control unit control circuit is further configured to add the at least one recognized landmark to the map if the quality value thereof exceeds a first threshold.

3. The localization device according to claim 1, wherein the control unit control circuit is configured to determine multiple quality values for each recognized landmark depending on a particular observation position or observation direction, and to add the quality values to the map.

4. The localization device according to claim 1, wherein the control unit control circuit is configured to remove a landmark from the map if the quality value is less than a second threshold during a new recognition.

5. The localization device according to claim 1, wherein the control unit control circuit is configured to determine the quality value of the landmark depending on at least one of a particular time of day or a particular time of year.

6. The localization device according to claim 1, wherein the control unit control circuit is configured to perform the position determination of the localization device with aid of an optimization method, in particular a pose graph optimization.

7. The localization device according to claim 1, further comprising a positioning device configured, in conjunction with the control unit, to determine a position of recognized landmarks in relation to a global coordinate system.

8. The localization device according to claim 1, wherein the quality value increases as a number of recognitions of the at least one landmark increases.

9. The localization device according to claim 1, further comprising a sending/receiving unit including a transmitter such that the sending/receiving unit configured to transfer the recognized landmark and the quality values thereof or the map to a backend.

10. A backend for producing a map for visual localization, comprising:
    a sending/receiving unit comprising a receiver configured to receive a landmark and a quality value thereof or a map from a localization device, the localization device including
        a camera unit for capturing image data, and
        a control unit comprising a control circuit on which program instructions are executed such that the control unit is configured to recognize at least one landmark in the captured image data, determine a quality value for each recognized landmark, which quality value corresponds to at least one of recognizability, permanence, or contribution of the landmark to localization, wherein the determination of the quality value involves multiple recognitions of the landmark, adjust the quality value of a landmark already contained in a map, based on a new recognition by the localization device, and determine a position of the localization device based on the recognized landmark in conjunction with the map;
    wherein the backend comprises a server such that the backend is configured to produce a combined quality value or combined quality values for the landmark from at least two quality values for the same landmark, each combined quality value for the landmark being a function of at least one of observation position or observation direction,
    wherein the combined quality value of each landmark varies based on the at least one of the observation position or the observation direction such that the combined quality value is a first value when the at least one of the observation position or observation direction corresponds to a front view of the landmark at a first angle, and is a second value when the at least one of the observation position or the observation direction corresponds to a front view of the landmark from an acute angle that is a smaller, more acute angle than the first angle, with the first value of the combined quality value being greater than the second value of the combined quality value.

11. The backend according to claim 10, wherein the backend receives a landmark and the quality value thereof from a plurality of localization devices and produces the map having a plurality of landmarks, each landmark having the combined quality value or combined quality values for the landmark.

12. The backend according to claim 10, wherein no image data form a basis of the observation position or the observation direction.

13. A method for visually determining a location of a vehicle, comprising:
- capturing of image data by a camera unit;
- recognizing of one landmark or multiple landmarks in the captured image data utilizing a control unit comprising a control circuit on which program instructions are executed;
- determining, utilizing the control unit control circuit, a quality value for each recognized landmark, which quality value corresponds to at least one of recognizability, permanence, or contribution of a particular landmark to vehicle localization, wherein the quality value involves multiple recognitions of the landmark;
- adding, utilizing the control unit control circuit, the recognized landmarks to a map if the quality values thereof each exceeds a first threshold and refraining from adding a recognized landmark to the map if the quality value of the recognized landmark does not exceed the first threshold;
- determining, utilizing the control unit control circuit, a position of a localization device comprising the camera unit and the control unit based on the recognized landmarks in conjunction with the map; and
- sending, by a transmitter of the localization device, the recognized landmarks and the quality values thereof or the map to a backend,
- wherein determining the quality value for each landmark comprises calculating the quality value for at least one of an observation position or an observation direction, wherein no image data form a basis of the at least one of the observation position or the observation direction.

14. The method according to claim 13, further comprising determining, by the control circuit, multiple quality values for each recognized landmark depending on at least one of a particular observation position or observation direction, and adding the quality values to the map such that the quality value of the landmark varies depending on the at least one of the observation position or observation direction.

15. The method according to claim 13, further comprising removing, by the control unit control circuit, a landmark from the map if the quality value of the landmark is a number that is less than a second threshold during a new recognition.

16. The method according to claim 13, wherein the quality value is a number that increases as a number of recognitions of the at least one landmark increases.

17. The method according to claim 13, wherein the contribution of the particular landmark to the localization is based on a deviation between a measured position of the landmark in the captured image and expected positions of the landmark in the captured image.

18. A method for visually determining a location of a vehicle, comprising:
- capturing of image data by a camera unit;
- recognizing of one landmark or multiple landmarks in the captured image data utilizing a control unit comprising a control circuit on which program instructions are executed;
- determining, utilizing the control unit control circuit, a quality value for each recognized landmark, which quality value corresponds to at least one of recognizability, permanence, or contribution of a particular landmark to vehicle localization, wherein the quality value involves multiple recognitions of the landmark;
- adding, utilizing the control unit control circuit, the recognized landmarks to a map if the quality values thereof each exceeds a first threshold and refraining from adding a recognized landmark to the map if the quality value of the recognized landmark does not exceed the first threshold;
- determining, utilizing the control unit control circuit, a position of a localization device comprising the camera unit and the control unit based on the recognized landmarks to conjunction with the map; and
- sending, by a transmitter of the localization device, the recognized landmarks and the quality values thereof or the map to a backend,
- wherein the quality value of each landmark varies based on the at least one of the observation position or the observation direction such that the quality value is a first value when the at least one of the observation position or observation direction corresponds to a front view of the landmark at a first angle, and is a second value when the at least one of the observation position or the observation direction corresponds to a front view of the landmark from an acute angle that is a smaller, more acute angle than the first angle, with the first value of the quality value being greater than the second value of the quality value.

* * * * *